US008069806B1

(12) United States Patent
Karafiath

(10) Patent No.: US 8,069,806 B1
(45) Date of Patent: Dec. 6, 2011

(54) CONNECTORLESS SEA TRAIN

(75) Inventor: Gabor Karafiath, Silver Spring, MD (US)

(73) Assignee: The United States of Americas as represented by the Secretary of the Navy, Washington, DC (US)

( * ) Notice: Subject to any disclaimer, the term of this patent is extended or adjusted under 35 U.S.C. 154(b) by 769 days.

(21) Appl. No.: 12/228,321

(22) Filed: Aug. 5, 2008

(51) Int. Cl.
*B63B 21/56* (2006.01)
(52) U.S. Cl. .......... 114/248; 114/77 A; 440/38
(58) Field of Classification Search .......... 114/248, 114/249, 77 A, 77 R; 440/38; 180/116, 121, 180/129
See application file for complete search history.

(56) References Cited

U.S. PATENT DOCUMENTS

| | | | |
|---|---|---|---|
| 3,820,258 A * | 6/1974 | Fahrner .......... | 114/248 |
| 5,301,629 A | 4/1994 | Kleyh et al. | |
| 6,053,790 A | 4/2000 | Langford | |
| 6,182,593 B1 * | 2/2001 | Wierick .......... | 114/249 |
| 7,685,955 B2 * | 3/2010 | Keck .......... | 114/249 |
| 7,845,297 B2 * | 12/2010 | Keck .......... | 114/249 |

OTHER PUBLICATIONS

Gabor Karafiath, SEATRAIN—Unique Connectorless Units Provide New Sealift Solution; SEAFRAME Jun. 2008, vol. 4, Issue 2, Carderock Division Publication.

* cited by examiner

*Primary Examiner* — Lars A Olson
(74) *Attorney, Agent, or Firm* — Dave A. Ghatt

(57) ABSTRACT

The invention is directed towards a watercraft module and a connectorless sea train including two or more of the watercraft modules. The watercraft modules in the sea train are formed in a bow-to-stern relationship and are held together by compression forces. Each module includes a hull having a bow end having a substantially V-shaped profile, and a stern end having either a continuous end or a substantially V-shaped notch cut therein. The size and shape of the substantially V-shaped notch is substantially similar to the size and shape of the substantially V-shaped profile of the bow end. In the sea train having two or more watercraft modules, the substantially V-shaped profile of the bow end of a trailing watercraft is received in the substantially V-shaped notch at the stern of a leading watercraft.

21 Claims, 6 Drawing Sheets

Method 400

Start
↓
410
Provide two or more watercrafts
↓
420
Form a bow-to-stern arrangement including two or more watercrafts
↓
430
Operate bow-to-stern arrangement at about 30 knots to about 50 knots
↓
End

CONNECTORLESS SEA TRAIN

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The following description relates generally to an energy conserving sea train, and in particular, a connectorless sea train arrangement in which two or more watercraft modules travel in a bow-to-stern arrangement in which a bow of a trailing watercraft is received within a notch at the stern of a leading watercraft.

BACKGROUND

Conventional shore-to-shore transportation of large quantities of cargo requires the use of large ships and deep harbors to accommodate for large ships. Because of their size and load, cargo carriers tend to consume a significant amount of energy. Generally speaking, the prior art does not teach energy efficient cargo transportation vessels having shore-to-shore capabilities for transporting large quantities of cargo, particularly ships capable of entering shallow harbors. Regarding sea trains, known arrangements of coupled ships involve flexor connectors, in which the loads on these connectors are as high as one half of the weight of a module. The prior art does not teach high-speed connectorless sea trains.

SUMMARY

In one aspect, the invention is a watercraft for a connectorless sea train. The watercraft includes a hull having a top side, a bottom side, a bow end having a substantially V-shaped profile, and a stern end, the stern end having a substantially V-shaped notch cut therein so that the substantially V-shaped notch extends from the top side of the hull to the bottom side of the hull. In this aspect the size and shape of the substantially V-shaped notch is substantially similar to the size and shape of the substantially V-shaped profile of the bow end.

In another aspect, the invention is a connectorless sea train for energy efficient high speed travel. The connectorless sea train includes two or more watercrafts. According to the invention, each of the two or more watercrafts has a hull having a top side, a bottom side, a bow end having a substantially V-shaped profile, and a stern end. In this aspect, the stern end may be a continuous end or a notched end. The notched end includes a substantially V-shaped notch cut therein so that the substantially V-shaped notch extends from the top side of the hull to the bottom side of the hull. According to the invention, the size and shape of the substantially V-shaped notch is substantially similar to the size and shape of the substantially V-shaped profile of the bow end. The invention further includes a bow-to-stern arrangement of the two or more watercrafts. The bow-to-stern arrangement includes a first watercraft of the two or more watercrafts, and a second watercraft of the two or more watercrafts. In this aspect, a bow end of the second watercraft is positioned within a substantially V-shaped notch at the stern end of the first watercraft, thereby forming a connectorless sea train.

In another aspect, the invention is an energy conserving method of operating two or more watercrafts at high speeds. The method includes the providing of two or more watercrafts. In this aspect, the method also includes the forming of a bow-to-stern arrangement with the two or more watercrafts. In the bow-to-stern arrangement, the last trailing watercraft includes a hull having, a top side, a bottom side, a bow end having a substantially V-shaped profile, and a stern end. In this aspect, the stern end is a continuous end or a notched end. In this aspect, the notched end has a substantially V-shaped notch cut therein so that the substantially V-shaped notch extends from the top side of the hull to the bottom side of the hull. The size and shape of the substantially V-shaped notch is substantially similar to the size and shape of the substantially V-shaped profile of the bow end. According to the method, each of the remaining watercrafts in the bow-to-stern has a hull having, a top side, a bottom side, a bow end having a substantially V-shaped profile, and a stern end. In this aspect, the stern end has a substantially V-shaped notch cut therein so that the substantially V-shaped notch extends from the top side of the hull to the bottom side of the hull. The size and shape of the V-shaped notch is substantially similar to the size and shape of the substantially V-shaped profile of the bow end. According to the method, the forming of the bow-to-stern arrangement includes the positioning of a bow end of a second of the two or more watercrafts within the substantially V-shaped notch at the stern end of a first of the two or more watercrafts. The energy conserving method of operating two or more watercrafts at high speeds further includes the operating of the bow-to-stern arrangement at a speed of about 30 knots to about 50 knots, wherein compressive forces created maintains the bow end of the second watercraft within the substantially V-shaped notch of the first watercraft.

BRIEF DESCRIPTION OF THE DRAWINGS

Other features will be apparent from the description, the drawings, and the claims.

DETAILED DESCRIPTION

Figure 1A:
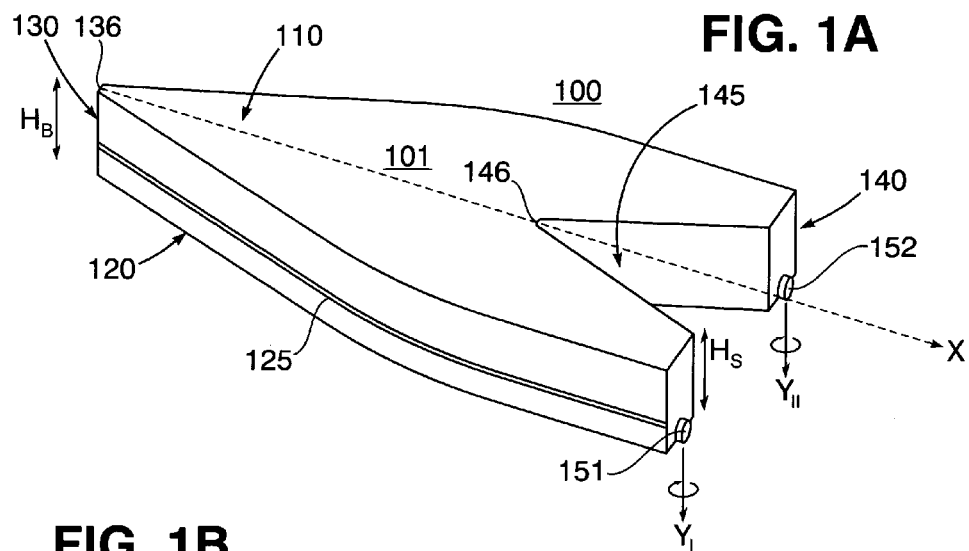
FIG. 1A is a schematic perspective illustration of a watercraft for a connectorless sea train, according to an embodiment of the invention.

FIG. 1A is a schematic perspective illustration of a watercraft 100 having a hull 101 for a connectorless sea train, according to an embodiment of the invention. As shown the hull 101 includes a top side 110 and a bottom side 120. The top side 110 of the watercraft may be a deck and there may be several additional decks between the top side 110 and the bottom side 120. FIG. 1A also shows a bow end 130 of the hull 101, as well as a stern end 140 having transom sections 141 and 142. The hull 101 may be made from one or more different materials, such as aluminum, steel, fiberglass, carbon fiber, or other materials depending on application requirements, as well as combinations of these materials. The transom sections 141 and 142 may each be fitted with a ramp or side doors for roll-on roll-off loading.

Figure 1B:
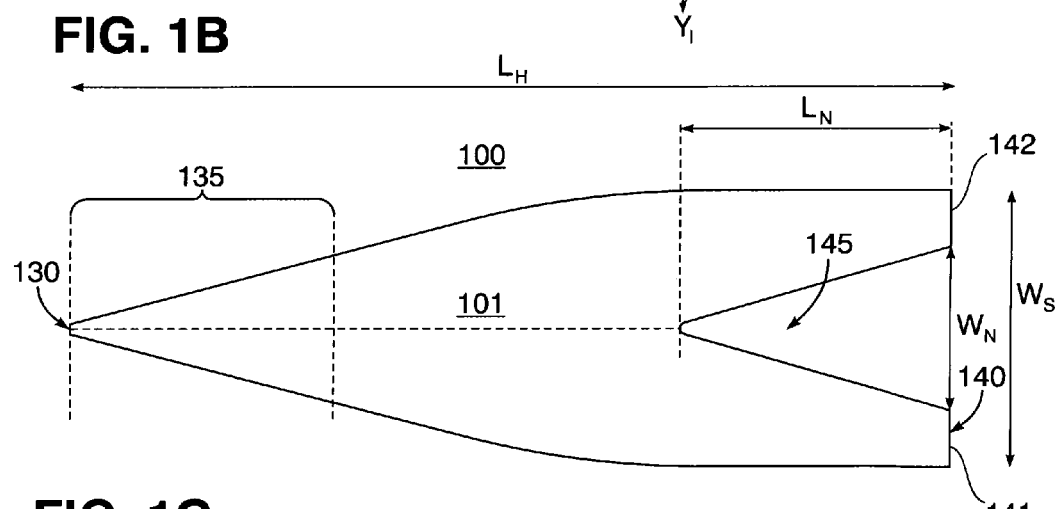
FIG. 1B is a top view of a watercraft for a connectorless sea train, according to an embodiment of the invention.

FIG. 1B is a top view of the hull 101 of a watercraft 100 for a connectorless sea train, according to an embodiment of the invention. FIGS. 1A and 1B both show the hull 101 at the bow end 130 having a substantially V-shaped cross section region 135. FIGS. 1A and 1B also show the stern end being a notched end having a substantially V-shaped notch 145. As illustrated, the substantially V-shaped cross section at the bow may include a flat transverse portion 136, and the substantially V-shaped notch 145 may include a flat transverse portion 146 at an apex region of the notch. FIG. 1B shows the bow region 135 having substantially similar dimensions to substantially V-shaped notch 145. FIG. 1B also shows different dimensions of the watercraft, including a hull length $L_H$ representing the bow-to-stern length of the hull, a notch length $L_N$ representing the length from the stern to the apex of the notch. FIG. 1B also shows a stern width $W_S$ at the stern of the watercraft, as well as a notch width at the stern $W_N$. FIG. 1A shows the hull 101 having a height $H_B$ at the bow and a height $H_S$ at the stern. FIG. 1A also shows a draft line 125 which represents the maximum waterline.

The dimensions are variable depending on the particular application. However, according to an embodiment of the invention, notch length $L_N$ may be about 0.25 to about 0.35 of the hull length $L_H$. Additionally, the notch width $W_N$ may be about 0.5 to about 0.6 of the stern width $W_S$. The hull length $L_H$ may be about 350 ft to about 650 ft, and the notch length $L_N$ may be about 105 ft to about 195 ft. Additionally, the stern width $W_S$ may be about 110 ft to about 200 ft and the notch width $W_N$ may be about 60 ft to about 110 ft. In one particular embodiment, the hull length $L_H$ may be about 500 ft, the notch length $L_N$ may be about 150 ft, the stern width $W_S$ may be about 160 ft, the notch width $W_N$ may be about 88 ft, and the height $H_B$ at the bow may be about 75 ft, and the height Hs at the stern may be about 60 ft. In this particular embodiment, the draft line 125 at the bow end 130 may be about 25 ft above the bottom end 120 of the hull.

Figure 1C:
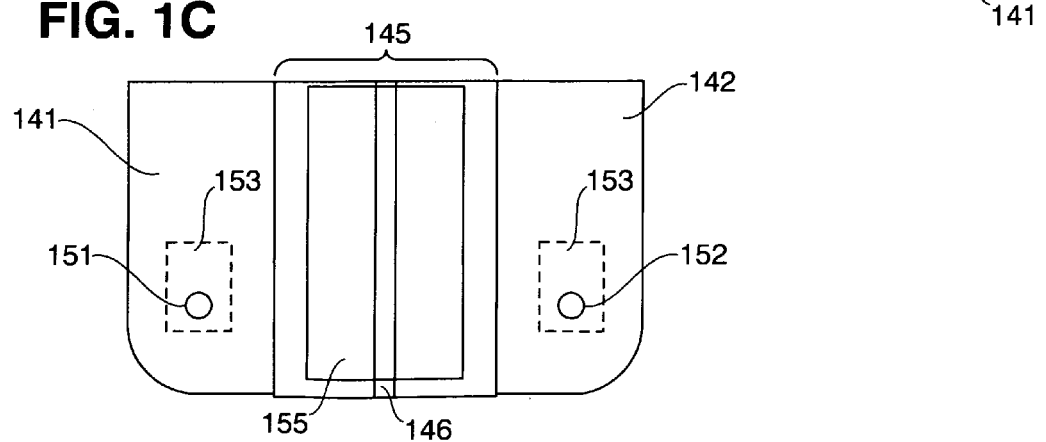
FIG. 1C is a back side view of a watercraft for a connectorless sea train, according to an embodiment of the invention.

FIG. 1C is a back side view of the watercraft 100 from the stern side looking towards the bow of the watercraft, according to an embodiment of the invention. FIG. 1C shows transom sections 141 and 142 located on either side of the substantially V-shaped notch 145. The watercraft 100 includes a propulsion system 153 having an immersed water-intake port for the intake of water, which is expelled through the exit nozzles 151 and 152. The exit nozzles 151 and 152 of the waterjet propulsion system 153 are located in transom sections 141 and 142, respectively. In one embodiment the exit nozzles 151 and 152 are positioned so they are about 90% above the draft line 125, however, the exit nozzles may be located in other known configurations with respect to the draft line 125. The exit nozzles 151 and 152 may be rotatable about orthogonal axes $Y_I$ and $Y_{II}$ respectively, as shown in FIG. 1A. Orthogonal axes $Y_I$ and $Y_{II}$, which are substantially vertical, are perpendicular to an elongated hull axis X. The exit nozzles 151 and 152 may be rotated to steer the watercraft. Alternatively, the exit nozzles 151 and 152 may be stationary, but may direct exit streams in a similar manner to rotatable nozzles by including deflectors for directing the exit stream at splayed angles. As will be outlined below, in sea train arrangements, the exit streams of a leading watercraft may be directed at an angle commensurate with the shape or angle of the bow of a trailing watercraft to enhance the effects of drafting.

FIG. 1C shows schematically, a bumper arrangement 155, which may be included within the substantially V-shaped notch 145. The bumper arrangement 155 may line the walls of the substantially V-shaped notch 145. Additionally, the bumper arrangement 155 may be stationary fenders, round rolling bumpers, or pneumatic fenders. Circular large diameter fenders may be used to absorb thrust forces and still allow vertical movement. The bumper arrangement 155 may be sized to be commensurate with the dimensions of the watercraft bow.

Figure 2A:
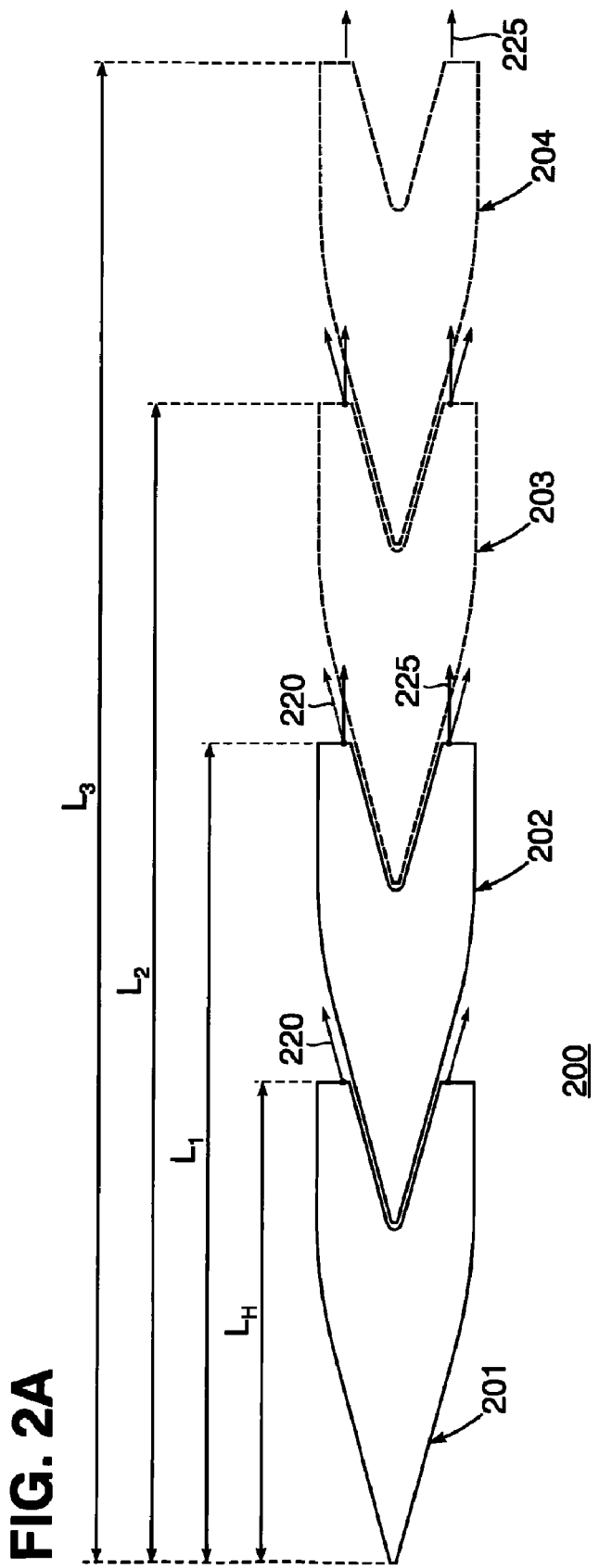
FIG. 2A is a top view of connectorless sea trains, according to an embodiment of the invention.

FIG. 2A is a top view a of connectorless sea train 200, according to an embodiment of the invention. In the exemplary illustration, the sea train 200 includes a two-craft arrangement having a first or lead watercraft module 201 and a second watercraft module 202. The sea train 200 may also be a three-craft arrangement having a third watercraft module 203 shown in dotted lines, or a four-craft arrangement having a fourth watercraft module 204, also shown in dotted lines. Each module is substantially identical and interchangeable. Each of the modules is structured as illustrated in FIGS. 1A-1C. Thus, each watercraft module 201, 202, 203, and 204 has a bow end 130 having a substantially V-shaped cross section region 135. Similar to the watercraft of FIGS. 1A-1C, each watercraft module 201, 202, 203, and 204 has a stern end having a substantially V-shaped notch 145. Each module may also include flat transverse portions 136 and 146. Although FIG. 2A shows the sea train 200 having two to four watercraft modules, a sea train may have more than four modules if desired. It should be noted that the depicted sea train 200 is not a static sea train and actually represents the watercraft modules 201, 202, 203, and 204 traveling at high speeds, from about 30 knots to about 50 knots. Alternatively, sea trains as depicted in FIG. 2A may also be operated at speeds of less than 30 knots. For example, the sea train 200 may operate at speeds from about 10 knots to about 30 knots.

As shown in FIG. 2A, in the two-craft sea train, the bow end of the second watercraft module 202 is positioned within the stern end of the first watercraft module 201. The substantially V-shaped cross section region 135 at the bow of watercraft module 202 is dimensioned to be commensurate with the substantially V-shaped notch 145 at the stern of watercraft module 201. Thus, a complementary connectorless linkage is formed between the two modules 201 and 202 when the bow of module 202 is inserted into the stern of module 201. In addition to the above connectorless linkage between modules 201 and 202, similar connectorless linkages may be formed between modules 202 and 203 in a three-craft sea train. Similarly, in four-craft sea trains, similar connectorless linkages may be formed between modules 203 and 204, in addition to the connectorless linkages among modules 201, 202, and 203. As illustrated in FIG. 1C, each V-shaped notch 145 may include a bumper arrangement 155, which is dimensioned to protect against jarring and potentially damaging contact between respective bows and sterns.

FIG. 2A further illustrates the lengths $L_1$, $L_2$, and $L_3$, measuring a length of a two-craft sea train, a three-craft sea train, and a four-craft sea train respectively. As outlined with respect to FIG. 1B, each watercraft module may have a length $L_H$. As outlined above, the hull length $L_H$ may be about 350 ft to about 650 ft. Thus, a two-craft sea train length $L_1$ may be about 600 ft to about 1110 ft. Additionally, a three-craft sea train length $L_2$ may be about 850 ft to about 1575 ft, and a four-craft sea train length $L_3$ may be about 1100 ft to about 2025 ft. In one particular embodiment in which each watercraft module has a hull length $L_H$ of about 500 ft, $L_1$ is about 850 ft, $L_2$ is about 1200 ft, and $L_3$ is about 1550 ft.

In operation, as outlined above, the sea trains 200 include two or more watercraft module, each module being substantially identical and interchangeable. The sea trains 200 generally operate at high speeds between about 30 knots to about 50 knots, but may also operate at reduced speeds, as low as about 10 knots for example. Each watercraft module is self propelled by waterjet propulsors having exit nozzles 151 and 152 as shown in FIGS. 1A and 1C. As will be outlined below, and as shown in FIG. 2A, the exit streams from nozzles 151 and 152 are adjustable to be either a splayed direction 220 or a rearward/aft direction 225. The exit streams may be directed either by rotation of the nozzles 151 and 152, or by using deflectors. The orientation of the exit streams depends on the position of the respective watercraft module within the sea train 200.

According to the invention, a two-craft sea train 200 is formed by directing the substantially V-shaped bow 135 of the trailing watercraft module into the substantially V-shaped notch 145 of a leading watercraft module. The formation of the sea train 200 is performed at reduced speeds. Three and four-craft sea trains are similarly formed by directing the bows of additional trailing modules into the sterns of leading modules. The modules in the sea train 200 are loaded up individually. The substantially V-shaped notch design allows modules to mate with a reasonable difference in draft, allowing each module to heave and pitch. Depending on the size of each interchangeable watercraft module, the difference in draft could be as much as 10 ft. As outlined above, the V-shaped notch, which may also include a fender 155, accommodates for both vertical and lateral motion between modules. The waterjet propulsion system provides precise steering so that one module can duck in behind the other and accelerate until the bow is secure in the notch. With all watercraft modules joined up, power is increased to full speed.

The drag on the lead watercraft module 201 is significantly greater than on trailing modules. Therefore in the illustration of FIG. 2A, the drag on the first watercraft module 201 is significantly greater than the drag on trailing modules 202, 203, and 204, regardless of the number of modules in the sea train. The substantially V-shaped notch design is very effective in reducing drag on trailing modules in sea trains by masking the bow wetted area and a portion of the bow pressure drag of trailing modules. The reduction in drag on trailing watercrafts is also influenced by the direction of the waterjet exit stream. As shown in FIG. 2A the exit stream of leading watercraft modules are directed in the splayed direction 220, preferably at an angle that circumscribes the shape of the bow of the immediately trailing module. Only the last trailing watercraft module directs the exit stream in the aft direction 225. Therefore, the last trailing module has more thrust than any of the leading modules.

In the exemplary embodiment in which the interchangeable watercrafts have a hull length $L_H$ of about 500 ft, a notch length $L_N$ of about 150 ft, a stern width $W_S$ of about 160 ft, a notch width $W_N$ of about 88 ft, a height $H_B$ of about 75 ft, the leading watercraft will have a bow wave normally associated with high speed travel. As shown in FIG. 2A, watercraft module 201 leads the sea train 200. Subsequent trailing modules 202, 203, and 204 experience flow from the watercraft immediately ahead, which has about a 10 ft immersion at the stern end. This flow is expected to impinge the trailing watercraft module at the bow at approximately 15 ft above the bottom side 120. Thus the trailing modules operate in troughs created by leading modules, and there is reduced drag on the trailing watercrafts. Additionally, the trailing watercrafts provide an additional pushing force on leading watercrafts. Thus, significant compressive forces are created between the watercrafts of the sea train.

As discussed below with respect to resistance and transport factor, because of the above outlined factors, sea trains as illustrated in FIG. 2A conserve energy. More power is required to run the watercraft modules individually than when the modules operate in a sea train. For example, in a three-craft arrangement, the power to operate the sea train 200 is about 50% less than required to operate the three watercraft modules individually. Generally, according to the invention, sea train combinations provide about 40% to about 50% reduction in resistance in comparison to the modules operating independently. A 10 knot increase in speed for the same installed power is achieved with the sea train configurations.

Figure 2B:
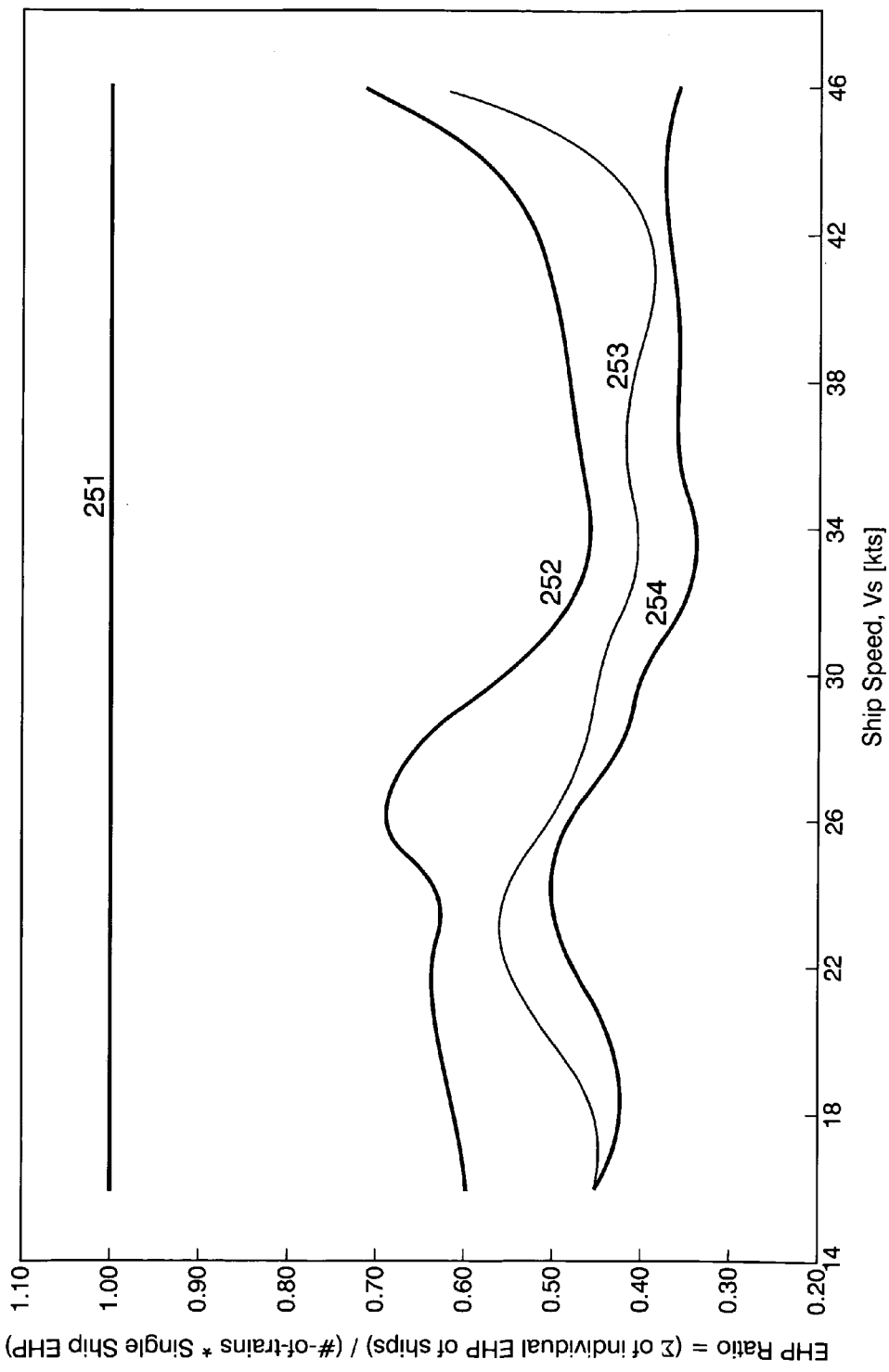
FIG. 2B is a resistance per unit chart showing test data of the effective power output per watercraft in relation to watercraft speed, according to embodiments of the invention.

FIG. 2B is a resistance per unit chart 250 showing test data of the effective power ratio of each watercraft module in relation to watercraft speed, according to embodiments of the invention. FIG. 2B essentially charts the horse power output required to overcome resistance encountered at certain test speeds. Chart 250 compares the effective horse power output values for each watercraft module in two-craft, three-craft, and four-craft sea train configurations. As shown, the effective horse power output values are taken for watercraft speeds between about 15 knots to about 46 knots. Data line 252 represents the horse power output values in relation to speed, for each module in a two-craft sea train. Data line 253 represents the horse power output values in relation to speed, for each module in a three-craft sea train. Data line 254 represents the horse power output values in relation to speed, for each module in a four-craft sea train. Chart 250 also shows data line 251 which shows the effective horse power output values for a single independent module.

As shown, the single independent watercraft module expends more power combating resistance than each module in the different sea train configurations. Data lines 254, 253, and 252 show the four-craft arrangement being the most energy efficient combating resistance, followed by the three-craft and two-craft arrangements respectively. Regarding the four-craft arrangement for example, at about the 35 knots, each watercraft in the four-craft unit expends about 35% of the effective horse power output, as compared to a single independent module. It should be noted that the chart 250 merely shows test values from embodiments operating at about 15 knots to about 46 knots. However, the sea trains as outlined in FIG. 2A operate and provide energy savings outside the speed ranges of chart 250 (FIG. 2B).

Figure 2C:
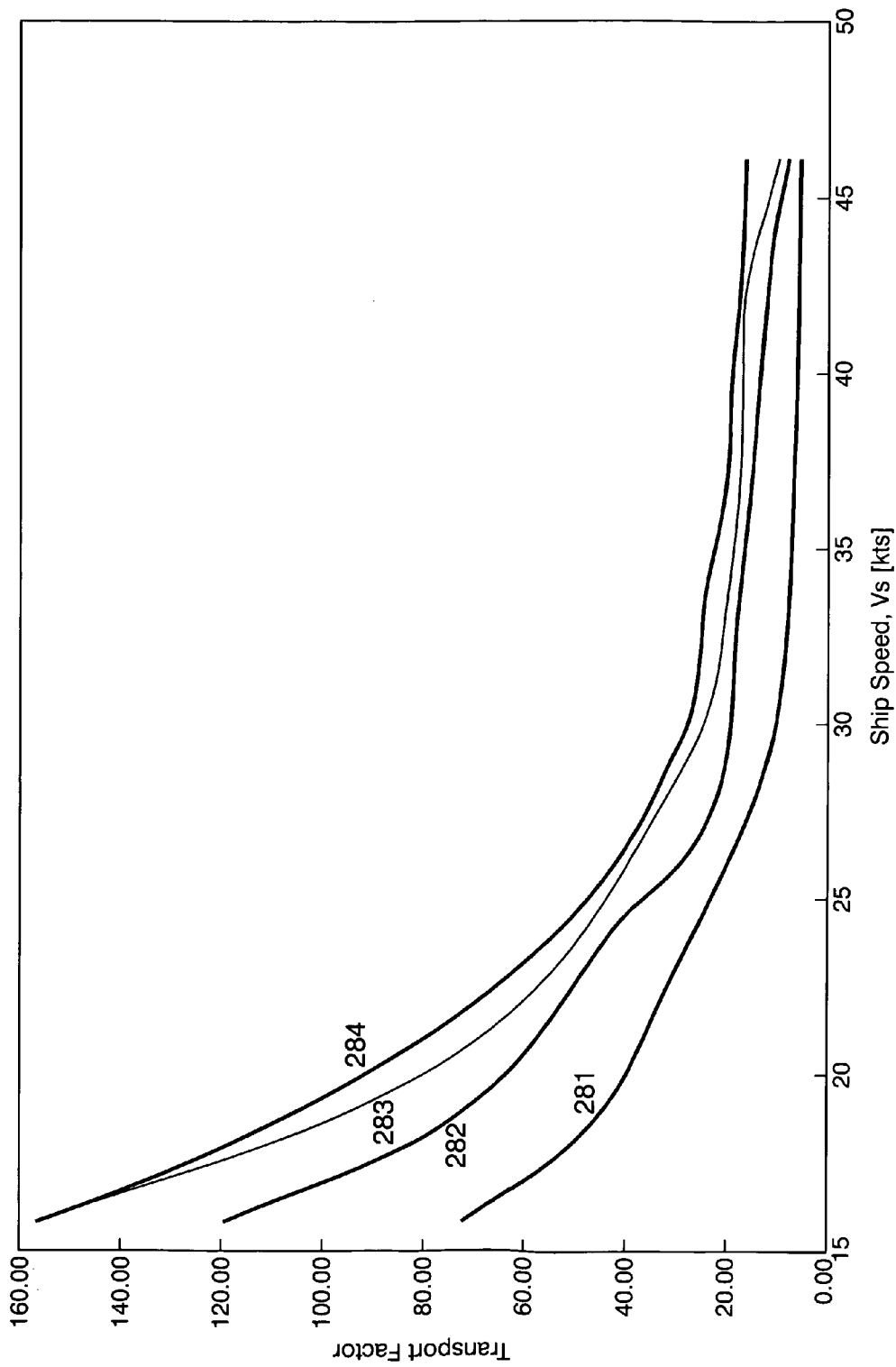
FIG. 2C is a chart showing test data of the transport factor per watercraft in relation to watercraft speed, according to embodiments of the invention.

FIG. 2C is a chart 280 showing test data of a transport factor per watercraft module in relation to watercraft speed, according to embodiments of the invention. The transport factor is a measure of efficiency that relates load carrying ability to power output. FIG. 2C charts the transport factor of each watercraft module at certain test speeds. Data line 282 represents the transport factor of each watercraft module in a two-craft sea train in relation to the speed of the sea train. Data line 283 represents the transport factor of each module in a three-craft sea train in relation to the speed of the sea train. Data line 284 represents the transport factor of each module in a four-craft sea train in relation to the speed of the sea train. Chart 280 also shows data line 281, which represents the speed of a single independent module in relation its speed. As shown by data lines 281, 282, 283, and 284, the transport factor increases for modules in sea trains, as compared to the independent module. In other words, the load carrying ability per power unit input is increased, for each module in a four-craft, a three-craft, and a two-craft sea train. Chart 280 shows the modules of the four-craft arrangement having the highest transport factor, followed by the modules of the three-craft and the two craft arrangements respectively. As outlined with respect to FIG. 2B, chart 280 merely shows test values from embodiments operating at about 15 knots to about 46 knots. However, the sea trains as outlined in FIG. 2A operate and provide energy savings outside the speed ranges of chart 280 (FIG. 2C).

Figure 2D:
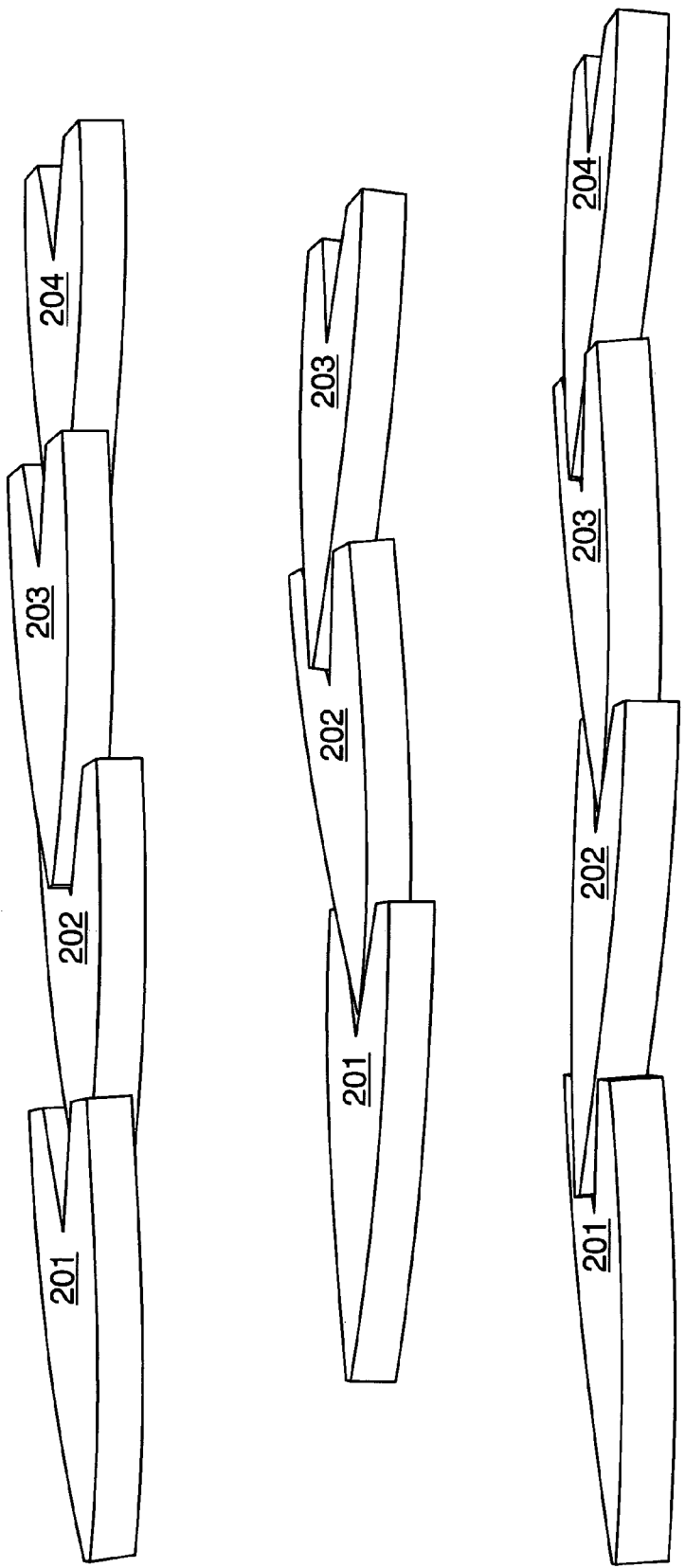
FIG. 2D shows schematic perspective illustrations of connectorless sea trains, according to embodiments of the invention.

FIG. 2D shows schematic perspective illustrations of connectorless sea trains 200, according to embodiments of the invention. FIG. 2D shows how the substantially V-shaped notches 145 along with the complementary bow sections 135, accommodate for vertical movement between watercraft modules. Depending on sea state conditions, the speeds of the modules may be adjusted to best maintain an operational sea train. If for example, at full power the watercraft modules come apart due to higher sea state forces, the sea train may be maintained by reducing the power on the lead watercraft module to increase compressive forces in the sea train. In high sea states such as Sea State 7, the watercrafts may reduce power and disengage, starting with the trailing watercraft. The watercraft modules may travel in a group of unattached modules until conditions allow for the reengagement of the sea train.

Figure 3:
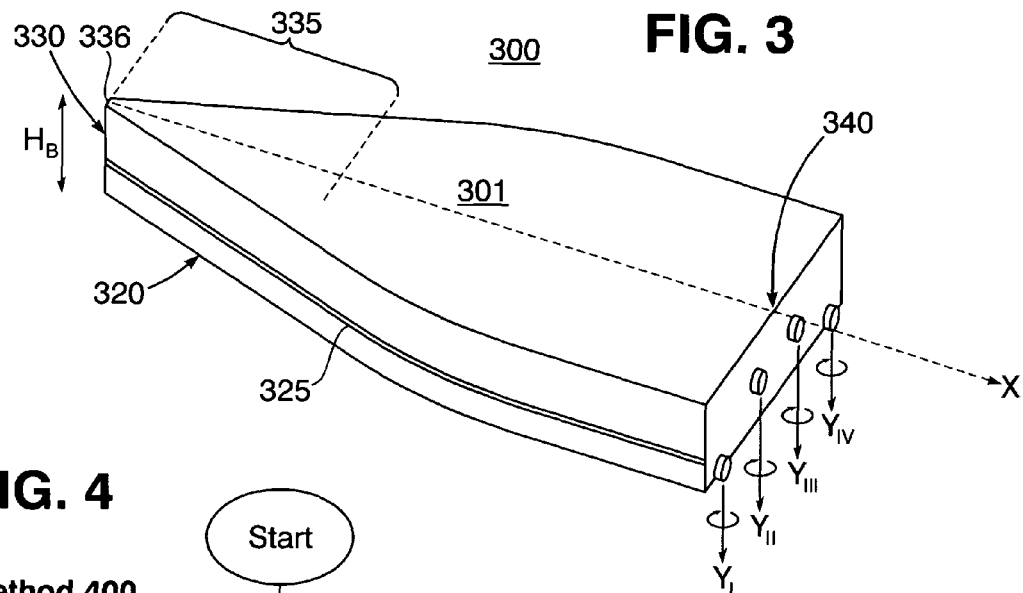
FIG. 3 is a schematic perspective illustration of a last trailing watercraft for a connectorless sea train, according to an embodiment of the invention.

FIG. 3 is a schematic perspective illustration of a last trailing watercraft 300 for a connectorless sea train, according to an embodiment of the invention. The dimensions and shape of watercraft 300 is similar to that of watercraft 100 shown in FIG. 1A. As outlined below, a difference between watercraft 100 and watercraft 300 is the absence of a substantially V-shaped notch at the stern of watercraft 300. Watercraft 300 includes a hull 301 having a top side 310 and a bottom side 320. The top side 310 of the watercraft may be a deck and there may be several additional decks between the top side 310 and the bottom side 320. FIG. 3 also shows a bow end 330 of the hull 301, which has a substantially V-shaped cross section region 335. The bow end 330 may include a transverse flat portion 336. FIG. 3 shows a stern end 340, which is a continuous end, as opposed to the notched configuration of FIG. 1A. Similar to watercraft 100, the watercraft 300 also includes a waterjet propulsion system having exit nozzles. As shown, the watercraft 300 may include exit nozzles 351, 352, as well as exit nozzles 353 and 354 which are also located at the stern end.

The watercraft 300 may be used utilized in a sea train, as shown in FIGS. 2A and 2D. However, because the stern end 340 is a continuous end, watercraft 300 may only be used as a last trailing watercraft in any given sea train arrangement. Therefore, returning to FIG. 2A, in a two-craft arrangement, watercraft 300 may be substituted for watercraft 202, and used as the last trailing watercraft. In a three-craft arrangement, watercraft 300 may be substituted for watercraft 203, and used as the last trailing watercraft. In a four-craft arrangement, watercraft 300 may be substituted for watercraft 204, and used as the last trailing watercraft. Because watercraft 300 may include additional nozzles 353 and 354 at the stern end 340, watercraft 300 can provide a greater thrust than the two-nozzle notched watercraft 100. Thus, the additional exit nozzles may be used to provide greater thrust, and therefore, greater compressive forces in any given sea train. The conditions affecting a sea trains as outlined with respect to FIG. 2D, have a similar affect on sea trains using watercraft 300 as the last trailing module. Additionally, sea train configurations using watercraft 300 as the last trailing module have similar energy efficient benefits as outlined with respect to FIGS. 2B and 2C.

Figure 4:
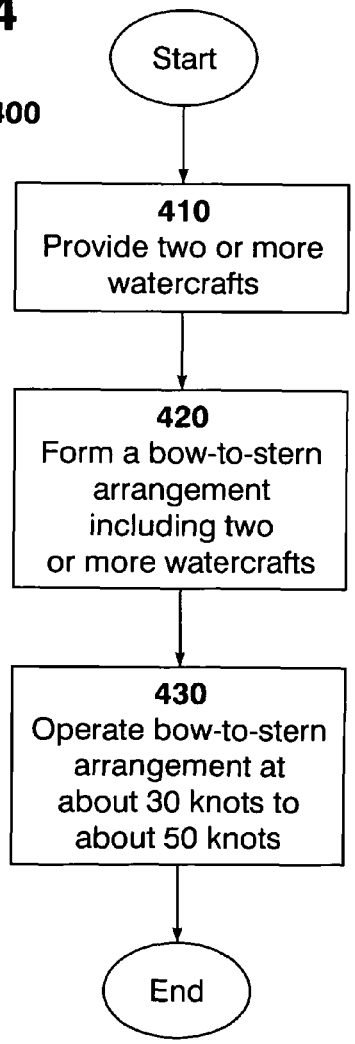
FIG. 4 is a flowchart illustrating an energy conserving method of operating two or more watercrafts according to an embodiment of the invention.

FIG. 4 is a flowchart illustrating an energy conserving method 400 of operating two or more watercraft modules according to an embodiment of the invention. The steps involved in the method 400 of operating the watercraft modules have been outlined above in detail in the description with respect to FIGS. 1A-3. FIG. 4 merely provides a broad overview of the method 400, and the method 400 may include additional steps provided in the specification. According to the method, step 410 is the providing of a watercraft module. FIGS. 1A-1C illustrate different elements of the watercraft module 100, as outlined above. FIG. 3 shows a watercraft 300 that may be used as the last trailing watercraft in a sea train arrangement. Step 420 is the forming of a bow-to-stern arrangement which includes the positioning of a bow end of a second of the two or more watercraft modules within the substantially V-shaped notch at the stern end of a first of the two or more watercraft modules, also outlined above. Step 430 is the operating of the sea train at a speed of about 30 knots to about 50 knots, wherein compressive forces created maintains the bow end of the second watercraft module within the substantially V-shaped notch of the first watercraft module.

As outlined with respect to FIG. 2D, the method 400 may involve adjustments in the operation of the sea train 200 based on sea state conditions. For example, at higher sea states, the speed of the leading watercraft module 201 may be reduced to increase compressive forces between the modules. Watercrafts 300 having a stern end that is continuous and includes additional exit nozzles, may be used for the increased thrust, and the accompanying increased compressive forces within the sea train. Also, in conditions such as Sea State 7, the sea train may be disassembled. The individual watercrafts may then travel in a group of disengaged modules until reassembly is possible. The above outlined method 400 may be utilized for military purposes or for commercial purposes such as short sea shipping, for example. In such a commercial application, a sea train of two or more watercraft modules may travel along a coastline carrying cargo to a predetermined destination. In the sea train, individual watercraft modules may have different destination points, so that as one or more individual modules reach their respective destination, other watercraft modules may be substituted into the sea train so that energy efficient transportation of cargo continues along the coastline to a final destination location.

What has been described and illustrated herein are preferred embodiments of the invention along with some variations. The terms, descriptions and figures used herein are set forth by way of illustration only and are not meant as limitations. Thus, although some dimensions are provided for the watercrafts and the sea trains, the watercrafts and sea trains may have larger or smaller dimensions. For example, hull lengths $L_H$ of about 350 ft to about 650 ft, have been outlined, but the watercrafts may alternatively have hull lengths $L_H$ that lie outside these ranges. Also, although the connectorless sea trains are applicable to high speed applications such as from about 30 knots to about 50 knots, the sea trains may also be employed in applications of reduced speeds. Additionally, although some embodiments of the invention refer to the "sea" train, the watercraft arrangements disclosed are operable and fully functional in any large body of water. Those skilled in the art will recognize that many variations are possible within the spirit and scope of the invention, which is intended to be defined by the following claims and their equivalents, in which all terms are meant in their broadest reasonable sense unless otherwise indicated.

What is claimed is:

1. A watercraft for a connectorless sea train, the watercraft comprising:
a hull comprising:
a top side;
a bottom side;
a bow end having a substantially V-shaped profile;
a stern end, the stern end having a substantially V-shaped notch cut therein so that the substantially V-shaped notch extends from the top side of the hull to the bottom side of the hull, wherein the size and shape of the substantially V-shaped notch is substantially similar to the size and shape of the substantially V-shaped profile of the bow end, the watercraft further comprising a waterjet propulsion arrangement attached to the hull, the waterjet propulsion arrangement comprising at least one exit nozzle on either side of the substantially V-shaped notch at the stern end of the hull, wherein each exit nozzle is rotatably adjustable.

2. The watercraft of claim 1, wherein the hull has a hull length measured from the bow end of the hull to the stern end of the hull, and the V-shaped notch has a notch length measured from the stern end to an apex of the notch, wherein the notch length is about 0.25 to about 0.35 of the hull length.

3. The watercraft of claim 2, wherein the stern end of the hull includes a stern width, and at the stern end the substantially V-shaped notch has a notch width, wherein the notch width is about 0.5 to about 0.6 of the stern width.

4. The watercraft of claim 3, wherein the substantially V-shaped profile comprises a transverse flat portion at an apex of the profile, and wherein the substantially V-shaped notch comprises a transverse flat receiving portion at the apex of the notch.

5. The watercraft of claim 4, further comprising:
a bumper arrangement within the V-shaped notch.

6. The watercraft of claim 5, wherein the hull has a hull length of about 350 ft to about 650 ft, a notch length of about 105 ft to about 195 ft, a stern width of about 110 ft to about 200 ft and a notch width of about 60 ft to about 110 ft.

7. The watercraft of claim 5, wherein the hull has a hull length of about 500 ft, a notch length of about 150 ft, a stern width of about 160 ft, a notch width of about 88 ft, and a hull depth at the bow end of about 75 ft.

8. A connectorless sea train for energy efficient high speed travel, the connectorless sea train comprising:
two or more watercrafts travelling at high speeds, each of the two or more watercrafts comprising:
a hull having:
a top side;
a bottom side;
a bow end having a substantially V-shaped profile; and
a stern end, the stern end being one of a continuous end or a notched end, wherein the notched end comprises a substantially V-shaped notch cut therein so that the substantially V-shaped notch extends from the top side of the hull to the bottom side of the hull, wherein the size and shape of the substantially V-shaped notch is substantially similar to the size and shape of the substantially V-shaped profile of the bow end;
a bow-to-stern arrangement of the two or more watercrafts, the arrangement comprising:
a first watercraft of the two or more watercrafts; and
a second watercraft of the two or more watercrafts, wherein a bow end of the second watercraft is positioned within a substantially V-shaped notch at the stern end of the first watercraft forming the connectorless sea train, wherein each of the two or more watercrafts further comprises:
a waterjet propulsion arrangement attached to the hull for propelling the connectorless sea train, the waterjet arrangement comprising at least one exit nozzle pair at the stern end, wherein when the connectorless sea train is propelled, the compressive forces developed among the two or more watercrafts at said high speeds is strong enough to maintain the bow end of the second watercraft within the substantially V-shaped notch at the stern end of the first watercraft without employing physical attachment devices.

9. The connectorless sea train of claim 8, wherein the stern end of each of the two or more watercrafts is a notched end, and in each of the two or more watercrafts the hull has a hull length measured from the bow end of the hull to the stern end of the hull, and the V-shaped notch having a notch length measured from the stern end to an apex of the notch, wherein the notch length is about 0.25 to about 0.35 of the hull length, and the stern end of the hull includes a stern width, and at the stern end the substantially V-shaped notch has a notch width, wherein the notch width is about 0.5 to about 0.6 of the stern width, and wherein each hull further includes a bumper arrangement within the substantially V-shaped notch.

10. The connectorless sea train of claim 9, wherein in each of the two or more watercrafts, each watercraft has a hull length of about 350 ft to about 650 ft, a notch length of about 105 ft to about 195 ft, a stern width of about 110 ft to about 200 ft and a notch width of about 60 ft to about 110 ft.

11. The connectorless sea train of claim 10, wherein the bow-to-stern arrangement of the two or more watercrafts further comprises:
a third watercraft of the two or more watercrafts, wherein the bow end of the third watercraft is positioned within the substantially V-shaped notch at the stern end of the second watercraft forming the connectorless sea train.

12. The connectorless sea train of claim 11, wherein each of the two or more watercrafts comprises:
an elongated hull axis;
one or more orthogonal axes perpendicular to the elongated hull axis, and
wherein each nozzle is rotatably adjustable,
wherein in the first watercraft each rotatably adjustable exit nozzle is rotated about an orthogonal axis so that exit nozzle fluids are splayed at an angle that circumscribes the shape of the bow of the second watercraft,
wherein in the second watercraft each rotatably adjustable exit nozzle is rotated about an orthogonal axis so that exit nozzle fluids are splayed at an angle that circumscribes the shape of the bow of the third watercraft,
wherein in the third watercraft each rotatably adjustable exit nozzle is maintained so that exit nozzle fluids are directed in a substantially aft direction, and
wherein each of the nozzles expels fluids at a rate that propels the sea train at a speed of about 30 knots to about 50 knots.

13. The connectorless sea train of claim 12, wherein each of the two or more watercrafts has a hull length of about 500 ft, a notch length of about 150 ft, a stern width of about 160 ft, a hull depth at the bow end of about 75 ft, and wherein when traveling at a speed of about 30 knots to about 50 knots, each of the two of more watercrafts comprises a draft line representing a waterline minimum level, the waterline maximum level being about 25 ft from the bottom side, and wherein in the sea train, the flow of water at the bow end of the hull of the first watercraft is at about the draft line, and wherein in each of the hulls of the second and third watercrafts, the flow at the respective bow end is about 15 ft from the bottom side.

14. The connectorless sea train of claim 8, wherein in the bow-to-stern arrangement of the two or more watercrafts, the stern end of the second watercraft is a continuous flat end and the waterjet arrangement has two pairs of nozzles at the continuous flat end for providing compression forces in the sea train.

15. A connectorless sea train for energy efficient high speed travel, the connectorless sea train comprising:
two or more watercrafts, each of the two or more watercrafts comprising:
a hull having:
a top side;
a bottom side;
a bow end having a substantially V-shaped profile; and
a stern end, the stern end being one of a continuous end or a notched end, wherein the notched end comprises a substantially V-shaped notch cut therein so that the substantially V-shaped notch extends from the top side of the hull to the bottom side of the hull, wherein the size and shape of the substantially V-shaped notch is substantially similar to the size and shape of the substantially V-shaped profile of the bow end;
a bow-to-stern arrangement of the two or more watercrafts, the arrangement comprising:
a first watercraft of the two or more watercrafts; and
a second watercraft of the two or more watercrafts, wherein a bow end of the second watercraft is positioned within a substantially V-shaped notch at the stern end of the first watercraft forming the connectorless sea train, wherein the bow-to-stern arrangement of the two or more watercrafts further comprises:
a third watercraft of the two or more watercrafts, wherein the bow end of the third watercraft is positioned within a substantially V-shaped notch at the stern end of the second watercraft forming the connectorless sea train, wherein the stern end of the third watercraft is a continuous end,
wherein each of the two or more watercrafts further comprises:
a waterjet propulsion arrangement attached to the hull for propelling the connectorless sea train at speeds of about 30 Knots to about 50 Knots, the waterjet arrangement comprising at least one exit nozzle pair at the stern end;
an elongated hull axis;
one or more orthogonal axes perpendicular to the elongated hull axis, and wherein in each of the two or more watercrafts each exit nozzle pair is rotatably adjustable, wherein in the first watercraft each rotatably adjustable exit nozzle pair is rotated about an orthogonal axis so that exit nozzle fluids are splayed at an angle that circumscribes the shape of the bow of the second watercraft,
wherein in the second watercraft each rotatably adjustable exit nozzle pair is rotated about an orthogonal axis so that exit nozzle fluids are splayed at an angle that circumscribes the shape of the bow of the third watercraft, and
wherein the third watercraft comprises two pairs of exit nozzles, each exit nozzle is maintained so that exit nozzle fluids are directed in a substantially aft direction.

16. An energy conserving method of operating two or more watercrafts at high speeds, the method comprising:
providing two or more watercrafts,
forming a connectorless bow-to-stern arrangement with the two or more watercrafts, wherein in the connectorless bow-to-stern arrangement, the last trailing watercraft comprises:
a hull having:
a top side;
a bottom side;
a bow end having a substantially V-shaped profile; and
a stern end having a waterjet propulsion arrangement having at least one pair of nozzles, the stern end being one of a continuous end or a notched end, wherein the notched end comprises a substantially V-shaped notch cut therein so that the substantially V-shaped notch extends from the top side of the hull to the bottom side of the hull, wherein the size and shape of the substantially V-shaped notch is substantially similar to the size and shape of the substantially V-shaped profile of the bow end;
and wherein each of the remaining watercrafts in the connectorless bow-to-stern arrangement comprises:
a hull having:
a top side;
a bottom side;
a bow end having a substantially V-shaped profile;
a stern end, the stern end having a substantially V-shaped notch cut therein so that the substantially V-shaped notch extends from the top side of the hull to the bottom side of the hull, wherein the size and shape of the V-shaped notch is substantially similar to the size and shape of the substantially V-shaped profile of the bow end; and, a waterjet propulsion arrangement attached to the hull, the waterjet propulsion arrangement comprising at least one exit nozzle on either side of the substantially V-shaped notch at the stern end of the hull, wherein each exit nozzle is rotatably adjustable,
wherein the forming of the connectorless bow-to-stern arrangement comprises positioning a bow end of a second of the two or more watercrafts within the substantially V-shaped notch at the stern end of a first of the two or more watercrafts, the method further comprising operating the connectorless bow-to-stern arrangement at a speed of about 30 knots to about 50 knots, wherein compressive forces created by the waterjet propulsion arrangements of the first and second watercrafts maintains the bow end of the second watercraft within the substantially V-shaped notch of the first watercraft.

17. The method of claim 16, wherein the forming of the connectorless bow-to-stern arrangement further comprises positioning the bow of a third of the two or more watercrafts within the substantially V-shaped notch at the stern end of the second of the two or more watercrafts, wherein compressive forces created by the waterjet propulsion arrangements of the first, second and third watercrafts maintains the bow ends of the second and third watercrafts within the respective substantially V-shaped notches of the first and second watercrafts.

18. The method of claim 17, wherein the third of the two or more watercrafts is provided with a stern end that is a notched end, and in each of the first, second, and third watercrafts, the hull has a hull depth of about 75 ft, a hull length of about 500 ft, a notch length of about 150 ft, a stern width of about 160 ft, and a notch width at the stern of about 88 ft, and wherein in the sea train a length from the bow of the first watercraft to the stern of the third watercraft is about 1200 ft.

19. The method of claim 18, wherein in the operating of the connectorless bow-to-stern arrangement at a speed of about 30 knots to about 50 knots, the flow of water at the bow end of the first watercraft is at about 25 ft above the bottom side, and wherein in each of the bow ends of the second and third watercrafts, the flow is about 15 ft above the bottom side.

20. The method of claim 17, wherein the forming of the connectorless bow-to-stern arrangement further comprises positioning the bow of a fourth of the two or more watercrafts within the substantially V-shaped notch at the stern end of the third of the two or more watercrafts, the method further comprising:
reducing the speed of only the first watercraft of the sea train to increase the compression forces among the two or more watercrafts in the sea train.

21. The method of claim 17, wherein the third of the two or more watercrafts is provided with a stern end that is a continuous end having a pair of exit nozzles, the method further comprising:
increasing the waterjet thrust of only the third watercraft of the sea train to increase the compression forces among the two or more watercrafts in the sea train.

* * * * *